July 30, 1968     E. VAILLETTE     3,394,806

VIBRATION ACTUATED SORTING DEVICE

Filed June 7, 1966

Inventor
Edgar Vaillette

By Charles R. Fay,

Attorney 3,394,806
VIBRATION ACTUATED SORTING DEVICE
Edgar Vaillette, Leominster, Mass., assignor to Sona-Tronic Company, Incorporated, Leominster, Mass., a corporation of Massachusetts
Filed June 7, 1966, Ser. No. 555,808
6 Claims. (Cl. 209—111.9)

ABSTRACT OF THE DISCLOSURE

A sorting apparatus including an inclined wave-like chute with a vibration responsive device mounted under it in close association, together with a trap for dumping any material which may come down the chute and cause it to vibrate, the vibration responsive device having electrically operated means associated with it which operate to dump the trap and to reclose the trap once the vibration stops.

---

This invention relates to a sorting device adapted to be actuated by vibration involving the use of a microphone which is affected by the vibration, i.e., sound waves for instance, and including a chute along which materials pass with a trap as a portion of the chute, said trap being actuated to dump out unwanted materials upon the actuation of the device under the sound conditions.

As an example, certain materials in more or less fluid form such as for instance foodstuffs, e.g., beans, potatoes, etc., travel along the chute as to processing machinery, but in the materials are foreign substances such as stones, nails, etc. As long as there are no such foreign substances present, the trap does not operate and the materials continue to flow; but when one of the foreign materials strikes the chute, it creates a vibration which is picked up by a microphone and leads through an amplifier and a relay to actuate means causing the trap to dump, the trap then returning to normal, so that operation of the processing machinery is not interrupted.

Other objects and advantages of the invention will appear hereinafter.

Reference is to be had to the accompanying drawings, in which.

Figure 1:
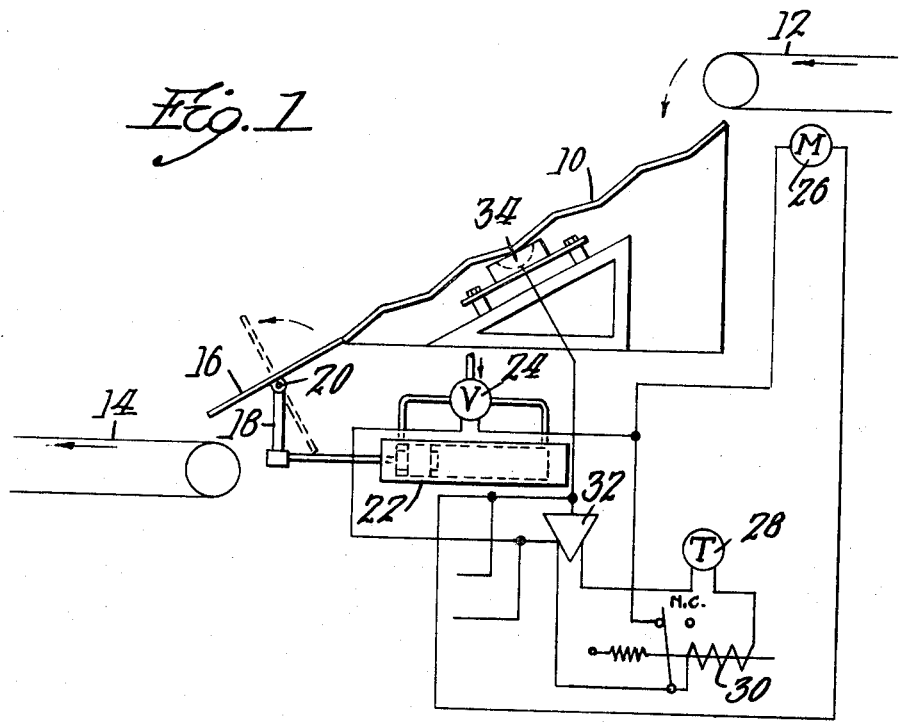
FIG. 1 is a diagram illustrating the operation of the invention.
Figure 2:
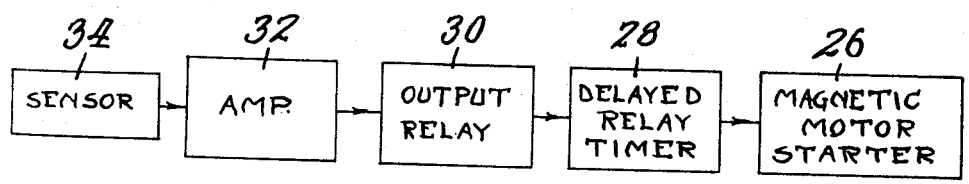
FIG. 2 is a flow chart showing the electric devices.

To illustrate the invention, there is shown in the drawing a chute or the like 10 which is preferably corrugated or formed in a wavy pattern. In this case the chute is shown on an incline so that materials, for instance emerging from conveyor 12, fall on the chute and proceed down it to another conveyor at 14. At the lower end of chute 10 there is a trap 16 substantially the same in width as the chute. Connected to it is an arm 18 which when moved about fixed pivot and support 20 in a clockwise direction causes the trap to move from normal solid line position to dotted line position, thereby dumping materials emerging from the end of the chute to a container or the like not shown. Control of the interval of dump is by a timer device.

To cause the trap to operate there is provided in the present case a pneumatic or hydraulic cylinder 22 connected to arm 18 and provided with a valve 24 operated by a magnetic motor starter or the like 26. Valve 24 is normally held in position to maintain the piston of the cylinder retracted.

The impulse to stop the motor is received through a timer 28 in turn actuated by a relay 30. The relay 30 receives its actuation by means of an amplifier 32 which is energized in the usual manner, but the signal pickup is through a microphone 34. The contact for the relay is normally closed.

When a stone or other more solid object than the materials being conveyed strikes the plate 10, it creates a vibration which is picked up by the microphone. This sends a signal to the amplifier which causes the closed contact on the output relay to open. The timer which can be set for different time dwells thus allows the trap to stay opened the required time to dump the unwanted materials and to stop the starter motor and the upper conveyor to prevent other materials from dumping onto the chute. As soon as the timer shuts off, valve 24 returns to normal position because the motor starter is in a sense shorted out by the relay.

The plate 10 is preferably waved as shown as it causes the foreign bodies to jump or skip slightly. It has been found in many cases that if the chute 10 were coplanar, certain foreign bodies tend merely to slide down the plate, thus not providing the vibration on which the device depends.

Having thus described my invention and the advantages thereof, I do not wish to be limited to the details herein disclosed, otherwise than as set forth in the claims, but what I claim is:

1. Sorting apparatus comprising a chute relatively inclined to the horizontal, a vibration responsive device mounted in close association therewith, a movable trap associated with said chute, means to move the trap to dump materials thereon, and means in cooperation with the vibration responsive device to control said trap moving means to cause the same to operate upon the presence of vibration in said chute, said chute having a contour setting up vibration in the chute upon the descent thereover of materials of predetermined hardness, whereas materials of appreciably less hardness fail to cause vibration in the chute.

2. The sorting apparatus of claim 1 wherein said vibration product device is a microphone, and including a circuit connecting said microphone with respect to said trap operating means.

3. The sorting apparatus of claim 2 in which the microphone circuit includes an amplifier and a relay, the vibration signal affecting the microphone passing through the amplifier to the relay and causing the same to actuate.

4. The sorting apparatus of claim 3 including a magnetically actuated device in said circuit, said magnetically actuated device being operatively connected to the relay to directly control the means for dumping the trap.

5. The sorting apparatus of claim 1 wherein the contour of said chute has a wave-like contour.

6. The sorting apparatus of claim 1 wherein the contour of said chute is wavy, the crests and troughs thereof being substantially horizontally arranged.

References Cited

UNITED STATES PATENTS 3,003,628   10/1961   Diamond _____ 209—72

FOREIGN PATENTS 1,125,740   3/1962   Germany.

M. HENSON WOOD, Jr., *Primary Examiner.*

R. A. SCHACHER, *Assistant Examiner.*